(12) United States Patent
Li et al.

(10) Patent No.: US 10,554,060 B2
(45) Date of Patent: Feb. 4, 2020

(54) SYSTEMS AND METHODS FOR CHARGING VIA USB PORT

(71) Applicant: Huawei Device Co., Ltd., Dongguan (CN)

(72) Inventors: Changqi Li, Shenzhen (CN); Yanguo He, Xi'an (CN); Lixiang Zheng, Xi'an (CN); Yanfeng Zhao, Xi'an (CN)

(73) Assignee: Huawei Device Co., Ltd., Dongguan (CN)

( * ) Notice: Subject to any disclaimer, the term of this patent is extended or adjusted under 35 U.S.C. 154(b) by 59 days.

(21) Appl. No.: 14/909,001

(22) PCT Filed: Jul. 22, 2014

(86) PCT No.: PCT/CN2014/082697
§ 371 (c)(1),
(2) Date: Jan. 29, 2016

(87) PCT Pub. No.: WO2015/014224
PCT Pub. Date: Feb. 5, 2015

(65) Prior Publication Data
US 2016/0181843 A1    Jun. 23, 2016

(30) Foreign Application Priority Data
Jul. 31, 2013    (CN) .......................... 2013 1 0330408

(51) Int. Cl.
*H02J 7/00*    (2006.01)

(52) U.S. Cl.
CPC ............. *H02J 7/0052* (2013.01); *H02J 7/007* (2013.01); *H02J 2007/0062* (2013.01)

(58) Field of Classification Search
CPC .... B60L 7/10; B60L 11/1848; B60L 11/1861; B60L 11/1864; B60L 11/1868;
(Continued)

(56) References Cited

U.S. PATENT DOCUMENTS 8,237,414 B1 *  8/2012  Li .................. H02J 7/0003
                                              320/103
2006/0128445 A1   6/2006  Kimata
(Continued)

FOREIGN PATENT DOCUMENTS

CN    1674452 A    9/2005
CN    1787589 A    6/2006
(Continued)

OTHER PUBLICATIONS

"USB Dedicated Charging Port Controller and Current Limiting Power Switch," TPS2511-Q1, XP055420944, Texas Instruments Incorporated (Jun. 2013).
(Continued)

*Primary Examiner* — Richard Isla
*Assistant Examiner* — Manuel Hernandez
(74) *Attorney, Agent, or Firm* — Leydig, Voit & Mayer, Ltd.

(57)  ABSTRACT

A power supply terminal, and a charging control method are disclosed. The power supply terminal includes a USB port, a switch, a power source module, and a processor, where the USB port is configured to connect to a power receiving terminal; one end of the power source module is connected to a power source pin VBUS of the USB port and is configured to charge the power receiving terminal by using the power source pin VBUS; a first end of the switch is connected to the data pin D+ and a second end of the switch is connected to the data pin D−; when the switch is on and the processor detects that a drop amplitude of the output voltage of the power source module exceeds a preset value, in a process in which the power source module outputs a voltage to charge the power receiving terminal.

8 Claims, 3 Drawing Sheets

(58) Field of Classification Search
CPC ... B60L 2250/16; H02J 7/0003; H02J 7/0021; H02J 7/0047; H02J 7/1423; H02J 7/1461; H02J 7/0052; H02J 7/0097; H02J 2007/0062; G06F 1/266; G06F 2213/0042
USPC .................................................. 320/109, 162
See application file for complete search history.

(56) References Cited

U.S. PATENT DOCUMENTS

| | | | |
|---|---|---|---|
| 2007/0132427 A1 | 6/2007 | Veselic | |
| 2010/0201308 A1* | 8/2010 | Lindholm | G06F 1/26 320/107 |
| 2010/0219790 A1 | 9/2010 | Chadbourne et al. | |
| 2011/0221604 A1* | 9/2011 | Johnson | G06F 1/266 340/664 |
| 2012/0119696 A1* | 5/2012 | Picard | H01M 10/48 320/107 |
| 2012/0210146 A1* | 8/2012 | Lai | G06F 1/266 713/310 |
| 2012/0293136 A1* | 11/2012 | Chen | G06F 1/266 320/162 |
| 2013/0049675 A1* | 2/2013 | Minami | H02J 7/0054 320/103 |
| 2013/0069600 A1* | 3/2013 | Knowlton | H02J 7/008 320/162 |
| 2013/0103878 A1* | 4/2013 | Ho | G06F 13/4068 710/316 |
| 2013/0300343 A1* | 11/2013 | Files | H02J 7/0055 320/103 |
| 2014/0015476 A1* | 1/2014 | Kondo | H02J 7/0029 320/107 |
| 2014/0245030 A1* | 8/2014 | Helfrich | G06F 1/26 713/300 |

FOREIGN PATENT DOCUMENTS

| | | |
|---|---|---|
| CN | 101478171 A | 7/2009 |
| CN | 102624037 A | 8/2012 |
| CN | 102681963 A | 9/2012 |
| CN | 103427460 A | 12/2013 |

OTHER PUBLICATIONS

Kidder, "The Dirty Truth about USB device Charging," XP055461382, (Aug. 18, 2010).

\* cited by examiner

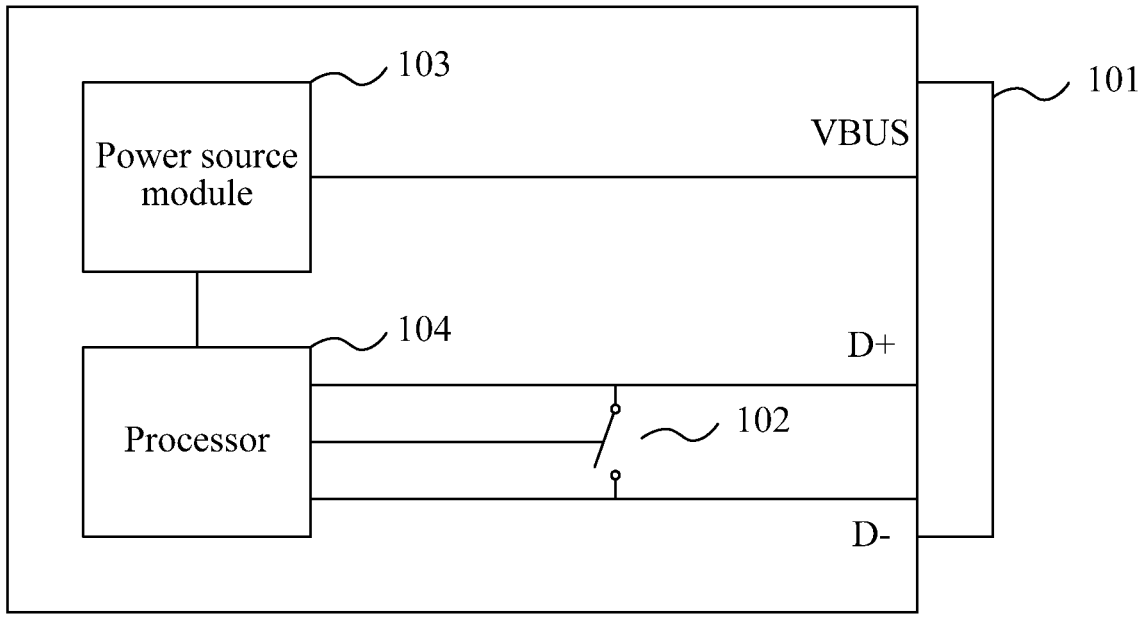

FIG. 1

| When a switch is in an on state, in a process in which a power source module outputs a voltage to charge a power receiving terminal, detect that a drop amplitude of the output voltage of the power source module exceeds a preset value, and perform control to turn off the switch | ~ 201 |

| Control, when the switch is in an off state, the power source module to output a voltage to charge the power receiving terminal | ~ 202 |

FIG. 2

SYSTEMS AND METHODS FOR CHARGING VIA USB PORT

This application is a National Stage of International Application No. PCT/CN2014/082697, filed on Jul. 22, 2014, which claims priority to Chinese Patent Application No. CN201310330408.0, filed with the Chinese Patent Office on Jul. 31, 2013 and entitled "POWER SUPPLY TERMINAL, AND CHARGING CONTROL METHOD AND APPARATUS," both of which are hereby incorporated by reference herein in their entireties.

TECHNICAL FIELD

The present invention relates to the field of terminal charging technologies, and in particular, to a power supply terminal, and a charging control method and apparatus.

BACKGROUND

At present, many terminals equipped with a large-capacity storage battery may be used as power supply terminals to charge other terminals. When a power supply terminal is connected to a power receiving terminal through a USB (Universal Serial Bus, universal serial bus) port, the following charging solution may be used to charge the power receiving terminal:

The power supply terminal short-circuits two data pins D+ and D– of the USB port, and charges the power receiving terminal by simulating a standard charger. When a charging capability of the power supply terminal can meet a requirement of the power receiving terminal, that is, when a maximum charging current that can be output by the power supply terminal is not less than a charging current required by the power receiving terminal, the power supply terminal can charge the power receiving terminal. However, when the charging capability of the power supply terminal cannot meet a requirement of the power receiving terminal, that is, when a maximum charging current that can be output by the power supply terminal is less than a charging current required by the power receiving terminal, a voltage at the USB port of the power supply terminal drops, which may eventually lead to a charging failure.

It can be seen that compatibility of the foregoing solution is relatively poor. In many cases, a power supply terminal cannot use the foregoing solution to charge a power receiving terminal.

SUMMARY

Embodiments of the present invention provide a power supply terminal, and a charging control method and apparatus, which are used to solve a problem of relatively poor compatibility of a terminal charging solution in the prior art.

According to a first aspect, a power supply terminal is provided, including a USB port, a switch, a power source module, and a processor, where:

the USB port is configured to connect to a power receiving terminal;

one end of the power source module is connected to a power source pin VBUS of the USB port and is configured to charge the power receiving terminal by using the power source pin VBUS, and the other end of the power source module is connected to one terminal of the processor;

two other terminals of the processor are separately connected to two data pins D+ and D– of the USB port;

the switch and the two data pins D+ and D– are connected in parallel to the processor; and when the switch is on, in a process in which the power source module outputs a voltage to charge the power receiving terminal, the processor detects that a drop amplitude of the output voltage of the power source module exceeds a preset value, and performs control to turn off the switch; and controls, when the switch is off, the power source module to output a voltage to charge the power receiving terminal.

With reference to the first aspect, in a first possible implementation manner, the processor is specifically configured to: after detecting that the drop amplitude of the output voltage of the power source module exceeds the preset value, and before performing control to turn off the switch, control the power source module to stop voltage output.

With reference to the first aspect or the first possible implementation manner of the first aspect, in a second possible implementation manner, the processor is further configured to: in the process in which the power source module outputs the voltage to charge the power receiving terminal, if detecting that the power receiving terminal is removed from the USB port, control the power source module to stop the voltage output.

With reference to the first aspect, the first possible implementation manner of the first aspect, or the second possible implementation manner of the first aspect, in a third possible implementation manner, the processor is specifically configured to control, when the switch is in the off state and based on an OTG protocol, the power source module to output the voltage to charge the power receiving terminal.

With reference to the first aspect, the first possible implementation manner of the first aspect, the second possible implementation manner of the first aspect, or the third possible implementation manner of the first aspect, in a fourth possible implementation manner, the processor is further configured to: when the switch is on, in the process in which the power source module outputs the voltage to charge the power receiving terminal, if detecting that the drop amplitude of the output voltage of the power source module does not exceed the preset value, control the power source module to output a voltage to charge the power receiving terminal until the charging is completed.

According to a second aspect, a charging control method is provided, including:

when a switch that is connected in parallel to two data pins D+ and D– of a USB port is on, in a process in which a power source module outputs a voltage to charge a power receiving terminal, detecting that a drop amplitude of the output voltage of the power source module exceeds a preset value, and performing control to turn off the switch; and controlling, when the switch is off, the power source module to output a voltage to charge the power receiving terminal.

With reference to the second aspect, in a first possible implementation manner, after the detecting that a drop amplitude of the output voltage of the power source module exceeds a preset value, and before the performing control to turn off the switch, the method includes a step of controlling the power source module to stop voltage output.

With reference to the second aspect or the first possible implementation manner of the second aspect, in a second possible implementation manner, the method further includes:

in the process in which the power source module outputs the voltage to charge the power receiving terminal, if it is detected that the power receiving terminal is removed from the USB port, controlling the power source module to stop the voltage output.

With reference to the second aspect, the first possible implementation manner of the second aspect, or the second possible implementation manner of the second aspect, in a third possible implementation manner, the controlling, when the switch is off, the power source module to output a voltage to charge the power receiving terminal specifically includes:

controlling, when the switch is in the off state and based on an OTG protocol, the power source module to output the voltage to charge the power receiving terminal.

With reference to the second aspect, the first possible implementation manner of the second aspect, the second possible implementation manner of the second aspect, or the third possible implementation manner of the second aspect, in a fourth possible implementation manner, when the switch is on, in the process in which the power source module outputs the voltage to charge the power receiving terminal, if it is detected that the drop amplitude of the output voltage of the power source module does not exceed the preset value, the power source module is controlled to output a voltage to charge the power receiving terminal until the charging is completed.

According to a third aspect, a charging control apparatus is provided, including:

a detection unit, configured to: when a switch that is connected in parallel to two data pins D+ and D− of a USB port is on, in a process in which a power source module outputs a voltage to charge a power receiving terminal, detect that a drop amplitude of the output voltage of the power source module exceeds a preset value; and a control unit, configured to perform control to turn off the switch, and control, when the switch is off, the power source module to output a voltage to charge the power receiving terminal.

With reference to the third aspect, in a first possible implementation manner, the control unit is specifically configured to: after it is detected that the drop amplitude of the output voltage of the power source module exceeds the preset value, and before performing control to turn off the switch, control the power source module to stop voltage output.

With reference to the third aspect or the first possible implementation manner of the third aspect, in a second possible implementation manner, the control unit is further configured to: in the process in which the power source module outputs the voltage to charge the power receiving terminal, if it is detected that the power receiving terminal is removed from the USB port, control the power source module to stop the voltage output.

With reference to the third aspect, the first possible implementation manner of the third aspect, or the second possible implementation manner of the third aspect, in a third possible implementation manner, the control unit is specifically configured to control, when the switch is in the off state and based on an OTG protocol, the power source module to output the voltage to charge the power receiving terminal.

With reference to the third aspect, the first possible implementation manner of the third aspect, the second possible implementation manner of the third aspect, or the third possible implementation manner of the third aspect, in a fourth possible implementation manner, the control unit is further configured to: when the switch is on, in the process in which the power source module outputs the voltage to charge the power receiving terminal, if it is detected that the drop amplitude of the output voltage of the power source module does not exceed the preset value, control the power source module to output a voltage to charge the power receiving terminal until the charging is completed.

According to the power supply terminal provided in the first aspect, the charging control method provided in the second aspect, or the charging control apparatus provided in the third aspect, a switch is disposed on the power supply terminal and is connected in parallel to two data pins D+ and D− of a USB port; control is performed to turn on the switch when a power receiving terminal is connected to the power supply terminal through the USB port, and the power supply terminal charges the power receiving terminal by simulating a standard charger; when the power supply terminal fails to charge the power receiving terminal by simulating a standard charger, the power supply terminal performs control to turn off the switch. The power supply terminal may communicate with the power receiving terminal, and the power supply terminal may charge the power receiving terminal according to a USB communications protocol, thereby improving compatibility.

BRIEF DESCRIPTION OF DRAWINGS

The accompanying drawings are used to provide a further understanding of the present invention, and constitute a part of the specification, which is used to explain the present invention along with embodiments of the present invention, and does not constitute any limitation to the present invention. In the accompanying drawings:

FIG. 1 is a schematic structural diagram of a power supply terminal according to an embodiment of the present invention;

FIG. 2 is a flowchart of a charging control method according to an embodiment of the present invention;

DESCRIPTION OF EMBODIMENTS

Figure 3:
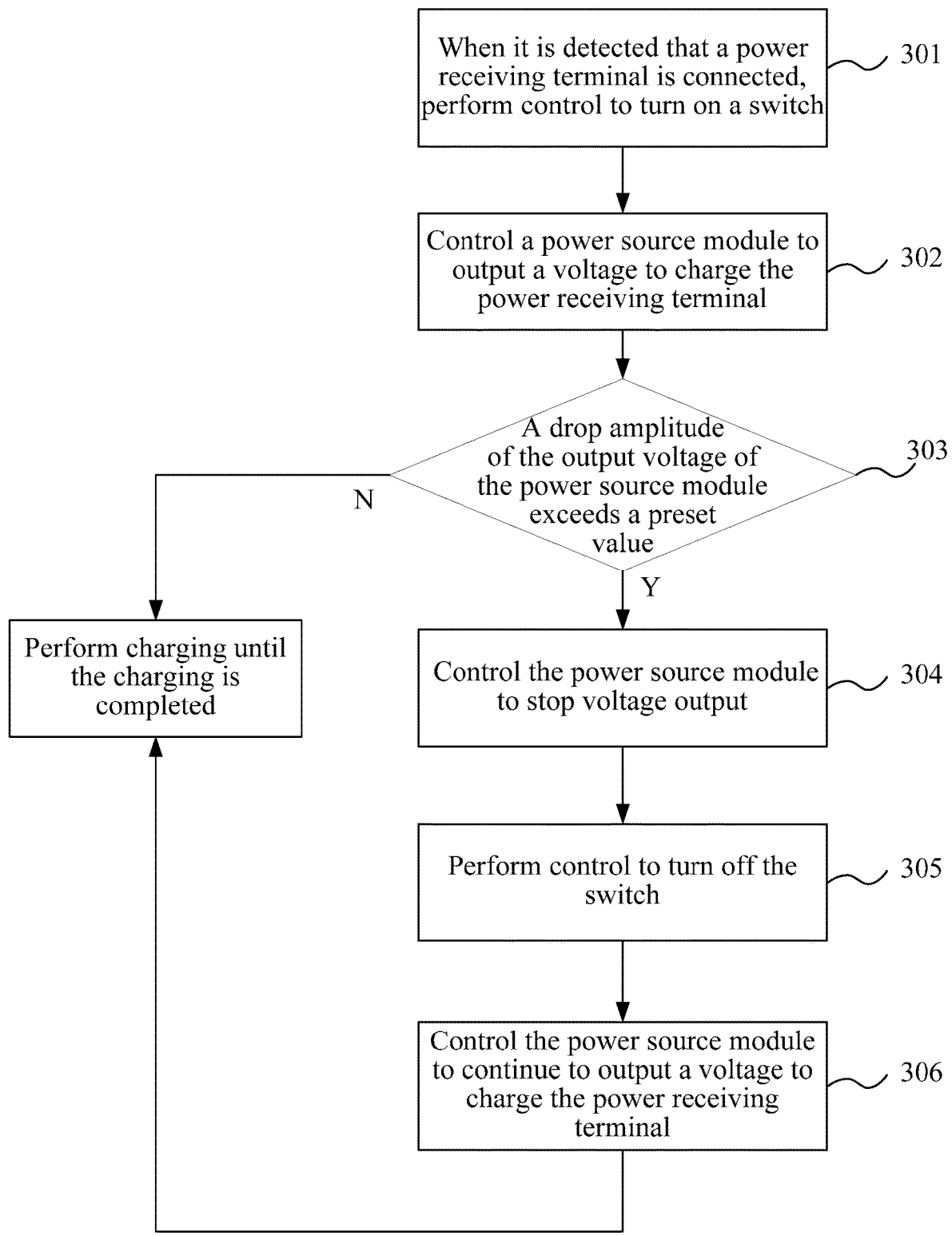
FIG. 3 is a detailed flowchart of a charging control method according to an embodiment of the present invention.

To improve compatibility of a terminal charging solution, the embodiments of the present invention provide a power supply terminal, and a charging control method and apparatus. Exemplary embodiments of the present invention are described below with reference to the accompanying drawings of the specification. It should be understood that the exemplary embodiments described herein are only used to describe and explain the present invention, but are not intended to limit the present invention. In a case without conflict, the embodiments in this application and features in the embodiments may be combined.

An embodiment of the present invention provides a power supply terminal. As shown in FIG. 1, the power supply terminal includes a USB port 101, a switch 102, a power source module 103 and a processor 104, where the USB port 101 is configured to connect to a power receiving terminal;

one end of the power source module 103 is connected to a power source pin VBUS of the USB port 101 and is configured to charge the power receiving terminal by using the power source pin VBUS, and the other end of the power source module 103 is connected to one terminal of the processor 104;

two other terminals of the processor 104 are separately connected to two data pins D+ and D− of the USB port 101;

the switch 102 and the two data pins D+ and D− are connected in parallel to the processor 104; and when the switch 102 is on, in a process in which the power source module 103 outputs a voltage to charge the power receiving terminal, the processor 104 detects that a drop amplitude of the output voltage of the power source module 103 exceeds a preset value, and performs control to turn off the switch 102; and controls, when the switch 102 is off, the power source module 103 to output a voltage to charge the power receiving terminal.

The power source module 103 may specifically include a storage battery and a voltage regulation circuit.

Further, the processor 104 is specifically configured to: after detecting that the drop amplitude of the output voltage of the power source module 103 exceeds the preset value, and before performing control to turn off the switch 102, control the power source module 103 to stop voltage output.

Further, the processor 104 is further configured to: in the process in which the power source module 103 outputs the voltage to charge the power receiving terminal, if detecting that the power receiving terminal is removed from the USB port 101, control the power source module 103 to stop the voltage output.

Further, the processor 104 is specifically configured to control, when the switch 102 is in the off state and based on an OTG (On The Go) protocol, the power source module 103 to output the voltage to charge the power receiving terminal.

An embodiment of the present invention further provides a charging control method. As shown in FIG. 2, the method includes the following steps:

Step 201: When a switch that is connected in parallel to two data pins D+ and D− of a USB port is on, in a process in which a power source module outputs a voltage to charge a power receiving terminal, detect that a drop amplitude of the output voltage of the power source module exceeds a preset value, and perform control to turn off the switch.

Step 202: Control, when the switch is off, the power source module to output a voltage to charge the power receiving terminal.

Further, after the detecting that a drop amplitude of the output voltage of the power source module exceeds a preset value, and before the performing control to turn off the switch, the method includes a step of controlling the power source module to stop voltage output.

Preferably, the charging control method may further include:

in the process in which the power source module outputs the voltage to charge the power receiving terminal, if it is detected that the power receiving terminal is removed from the USB port, controlling the power source module to stop the voltage output.

Further, step 203 may specifically be:

controlling, when the switch is in the off state and based on an OTG protocol, the power source module to output the voltage to charge the power receiving terminal.

The charging control method provided in the present invention is described in detail below with reference to a specific embodiment.

As shown in FIG. 3, FIG. 3 is a detailed flowchart of a charging control method according to an embodiment of the present invention, which specifically includes the following steps:

Step 301: When detecting that a power receiving terminal is connected through a USB port, a power supply terminal performs control to turn on a switch that is connected in parallel to two data pins D+ and D− of the USB port.

The power supply terminal may detect, by detecting an electrical level of an ID pin of the USB port, whether the power receiving terminal is inserted. If the electrical level of the ID pin of the USB port is pulled down, it indicates that the power receiving terminal is inserted. This part is the prior art, and no further details are provided herein.

Step 302: The power supply terminal controls a power source module that is connected to a power source pin VBUS of the USB port to output a voltage to charge the power receiving terminal.

In this case, the power supply terminal charges the power receiving terminal by simulating a standard charger.

In the prior art, a standard voltage at the USB port is 5 V, and a maximum charging current of 1 A can be output to charge the power receiving terminal. That is, the power source module outputs a voltage of 5 V, and can output a maximum charging current of 1 A.

Step 303: The power supply terminal detects the output voltage of the power source module, to determine whether a drop amplitude of the output voltage of the power source module exceeds a preset value.

When the power supply terminal detects that the drop amplitude of the output voltage of the power source module exceeds the preset value, that is, when a drop amplitude of a voltage at the USB port exceeds the preset value, it indicates that when the power supply terminal charges the power receiving terminal by simulating a standard charger, a charging capability cannot meet a requirement of the power receiving terminal, and in this case, step 304 is performed. Otherwise, it indicates that when the power supply terminal charges the power receiving terminal by simulating a standard charger, the charging capability can meet a requirement of the power receiving terminal, in this case, the power supply terminal may keep charging the power receiving terminal by simulating the standard charger until the charging is completed, and the procedure ends.

The preset value may be specifically set according to an actual situation.

That is, when a maximum charging current that can be output at the USB port of the power supply terminal is 1 A, if a charging current required by the power receiving terminal is greater than 1 A and a caused voltage drop exceeds the preset value, step 304 is performed.

Step 304: The power supply terminal controls the power source module to stop voltage output.

In this case, the voltage output at the USB port is stopped.

Step 305: The power supply terminal performs control to turn off the switch that is connected in parallel to the two data pins D+ and D− of the USB port.

In this case, the power supply terminal may communicate with the power receiving terminal by using the two data pins D+ and D− of the USB port. Specifically, the communication may be based on an OTG protocol, the power supply terminal functions as an OTG primary device, and the power receiving terminal functions as an OTG secondary device.

The foregoing step 304 and step 305 are not necessarily performed in a sequential order. In another embodiment of the present invention, step 305 may be performed first, and then step 304 is performed; that is, control is performed first to turn off the switch that is connected in parallel to the two data pins D+ and D− of the USB port, and then the power source module is controlled to stop the voltage output.

Step 306: The power supply terminal controls the power source module to continue to output a voltage to charge the power receiving terminal.

In this case, a voltage is output at the USB port.

In the OTG protocol, a charging current required by the OTG secondary device is 500 mA. In this case, the charging capability of the power supply terminal can meet a requirement of the power receiving terminal, and the power supply terminal may keep charging the power receiving terminal until the charging is completed.

In the foregoing process of charging the power receiving terminal, when detecting that the power receiving terminal is removed, the power supply terminal controls the power source module to stop the voltage output, so that the voltage output is stopped at the USB port.

By using the method provided in this embodiment of the present invention, relatively good compatibility is achieved, and a power supply terminal charges a power receiving terminal by preferentially simulating a standard charger, so as to enable the power receiving terminal to obtain a charging current as large as possible; and when the power supply terminal fails to charge the power receiving terminal by simulating a standard charger, the power supply terminal charges, based on a USB communications protocol, the power receiving terminal, so that a terminal charging time can be shortened as much as possible, thereby improving charging efficiency and improving user experience.

Figure 4:
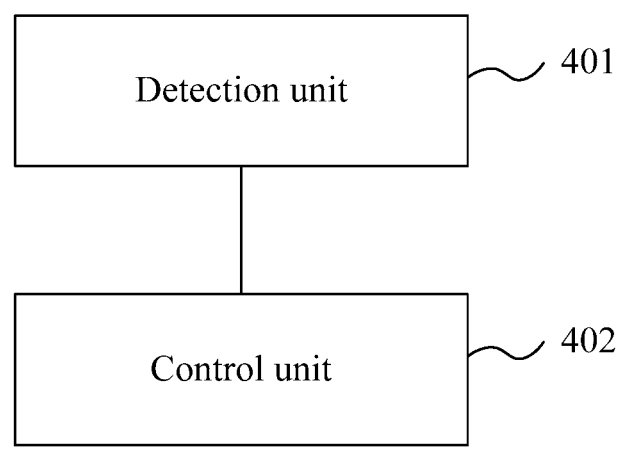
FIG. 4 is a schematic structural diagram of a charging control apparatus according to an embodiment of the present invention.

Based on the same inventive concept, and according to the charging control method provided in the foregoing embodiments of the present invention, correspondingly, an embodiment of the present invention further provides a charging control apparatus, where a structural diagram of the charging control apparatus is shown in FIG. 4, and the charging control apparatus specifically includes:

a detection unit 401, configured to: when a switch that is connected in parallel to two data pins D+ and D− of a USB port is on, in a process in which a power source module outputs a voltage to charge a power receiving terminal, detect that a drop amplitude of the output voltage of the power source module exceeds a preset value; and a control unit 402, configured to perform control to turn off the switch, and control, when the switch is off, the power source module to output a voltage to charge the power receiving terminal.

Further, the control unit 402 is specifically configured to: after it is detected that the drop amplitude of the output voltage of the power source module exceeds the preset value, and before performing control to turn off the switch, control the power source module to stop voltage output.

Further, the control unit 402 is further configured to: in the process in which the power source module outputs the voltage to charge the power receiving terminal, if it is detected that the power receiving terminal is removed from the USB port, control the power source module to stop the voltage output.

Further, the control unit 402 is specifically configured to control, when the switch is in the off state and based on an OTG protocol, the power source module to output the voltage to charge the power receiving terminal.

In conclusion, by using the solutions provided in the embodiments of the present invention, a problem of relatively poor compatibility of a terminal charging solution in the prior art is solved.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

The invention claimed is:

1. A charging control method, comprising:
performing control during a process in which a power source outputs an output voltage on a power source pin VBUS of a Universal Serial Bus (USB) port to charge a power receiving terminal connected to the USB port, when a switch is on and a drop amplitude of the output voltage of the power source exceeds a preset value, to turn off the switch and stop the power source from outputting the output voltage at the power source pin VBUS of the USB port, wherein a first end of the switch is connected to a data pin D+ of the USB port and a second end of the switch is connected to a data pin D− of the USB port, and when the switch is on, the first end and the second end of the switch are electrically connected;
communicating with the power receiving terminal using the data pin D+ and the data pin D− of the USB port in accordance with a communications protocol to reduce a charging current required by the power receiving terminal below a maximum charging current capability of the power source, wherein the communications protocol is an OTG (On The Go) protocol; and
controlling, when the switch is turned off and after communicating with the power receiving terminal using the data pin D+ and the data pin D−, the power source to continue charging the power receiving terminal by outputting the output voltage at the power source pin VBUS of the USB port.

2. The method according to claim 1, wherein the charging current required by the power receiving terminal in accordance with the OTG protocol is 500 milliamperes (mA).

3. The method according to claim 2, wherein the charging current required by the power receiving terminal when the switch is on is greater than 1 ampere (A).

4. The method according to claim 1, wherein the output voltage is 5 volts (V) when the charging current required by the power receiving terminal is less than the maximum charging current capability of the power source.

5. A power supply terminal, comprising a USB port, a switch, a power source, and a processor, wherein:
the USB port is configured to connect the power supply terminal to a power receiving terminal;
one end of the power source provides an output voltage to a power source pin VBUS of the USB port, wherein the output voltage is configured to charge the power receiving terminal via the power source pin VBUS;
a first end of the switch is connected to a data pin D+ of the USB port and a second end of the switch is connected to a data pin D− of the USB port, wherein when the switch is on, the first end and the second end of the switch are electrically connected; and the processor is configured to:
- when the switch is on, control the power source to provide the output voltage at the power source pin VBUS of the USB port to charge the power receiving terminal,
- responsive to detecting that a drop amplitude of the output voltage of the power source exceeds a preset value, perform control to turn off the switch and stop the power source from outputting the output voltage at the power source pin VBUS,
- communicate, according to a communications protocol, with the power receiving terminal using the data pin D+ and the data pin D− to reduce a charging current required by the power receiving terminal below a maximum charging current capability of the power source, wherein the communications protocol is an OTG (On The Go) protocol, and
- when the switch is off and after communicating with the power receiving terminal using the data pin D+ and the data pin D−, control the power source to provide the output voltage at the power source pin VBUS of the USB port to continue charging the power receiving terminal.

6. The power supply terminal according to claim 5, wherein the charging current required by the power receiving terminal in accordance with the OTG protocol is 500 milliamperes (mA).

7. The power supply terminal according to claim 6, wherein the charging current required by the power receiving terminal when the switch is on is greater than 1 ampere (A).

8. The power supply terminal according to claim 5, wherein the output voltage is 5 volts (V) when the charging current required by the power receiving terminal is less than the maximum charging current capability of the power source.

* * * * *